(12) United States Patent
Valentine

(10) Patent No.: US 11,617,350 B1
(45) Date of Patent: Apr. 4, 2023

(54) PROTECTIVE SLEEVE FOR ANIMAL TAIL AND METHOD OF USE

(71) Applicant: Julie A Valentine, St. Charles, IL (US)

(72) Inventor: Julie A Valentine, St. Charles, IL (US)

( * ) Notice: Subject to any disclaimer, the term of this patent is extended or adjusted under 35 U.S.C. 154(b) by 137 days.

(21) Appl. No.: 16/974,364

(22) Filed: May 26, 2020

Related U.S. Application Data

(63) Continuation-in-part of application No. 16/005,159, filed on Jun. 11, 2018, now abandoned.

(51) Int. Cl.
*A01K 13/00* (2006.01)

(52) U.S. Cl.
CPC .......... *A01K 13/005* (2013.01); *A01K 13/006* (2013.01)

(58) Field of Classification Search
CPC .............................. A01K 13/005; A01K 13/006
USPC .......................................................... 119/850
See application file for complete search history.

(56) References Cited

U.S. PATENT DOCUMENTS

| | | | | |
|---|---|---|---|---|
| 2,974,635 A * | 3/1961 | McDowell | ........... | A01K 13/006 119/854 |
| 4,141,197 A * | 2/1979 | Nichols | ..................... | B68B 7/00 54/78 |
| 4,972,660 A * | 11/1990 | Black | ................... | A01K 13/005 54/78 |
| 5,025,613 A * | 6/1991 | Connors | ............. | A01K 13/006 54/78 |
| 5,146,874 A * | 9/1992 | Vidal | ..................... | A01K 23/00 119/869 |
| 5,462,020 A * | 10/1995 | Trimmer | .............. | A01K 13/006 54/78 |
| 8,061,366 B2 * | 11/2011 | Britton | ..................... | A45D 8/36 132/273 |
| 10,477,836 B1 * | 11/2019 | Brown | ..................... | B68B 7/00 54/78 |
| 2007/0012263 A1 * | 1/2007 | Hammonds | .......... | A01K 13/006 119/850 |
| 2015/0156987 A1 * | 6/2015 | Baynes | ................ | A01K 13/006 119/850 |
| 2015/0189859 A1 * | 7/2015 | John | ..................... | A01K 23/00 119/868 |
| 2017/0156295 A1 * | 6/2017 | Zoltanski | ............... | A01K 23/00 119/868 |

* cited by examiner

*Primary Examiner* — Magdalena Topolski
*Assistant Examiner* — Morgan T Jordan

(57) ABSTRACT

A tail protection device for dogs that includes a sleeve for covering the tail, and straps to connect it to a common dog harness. It secures the tail from injury, especially "Happy Tail Syndrome."

6 Claims, 8 Drawing Sheets

PROTECTIVE SLEEVE FOR ANIMAL TAIL AND METHOD OF USE

CROSS REFERENCE

This application is a continuation-in-part of non-provisional U.S. patent application Ser. No. 16/005,159, titled, "PROTECTIVE SLEEVE FOR ANIMAL TAIL," filed 11 Jun. 2018, which claims the benefit of provisional application no. US2017/62520974P, filed 16 Jun. 2017, by inventor Julie Ann Valentine, and is incorporated here by reference, including the specifications.

BRIEF DESCRIPTION OF DRAWINGS

Non-limiting and non-exhaustive examples of several of the various embodiments of the present invention are described with references to the following figures, and reference numbers refer to the same features throughout the various views and embodiments unless otherwise specified.

Figure 1:
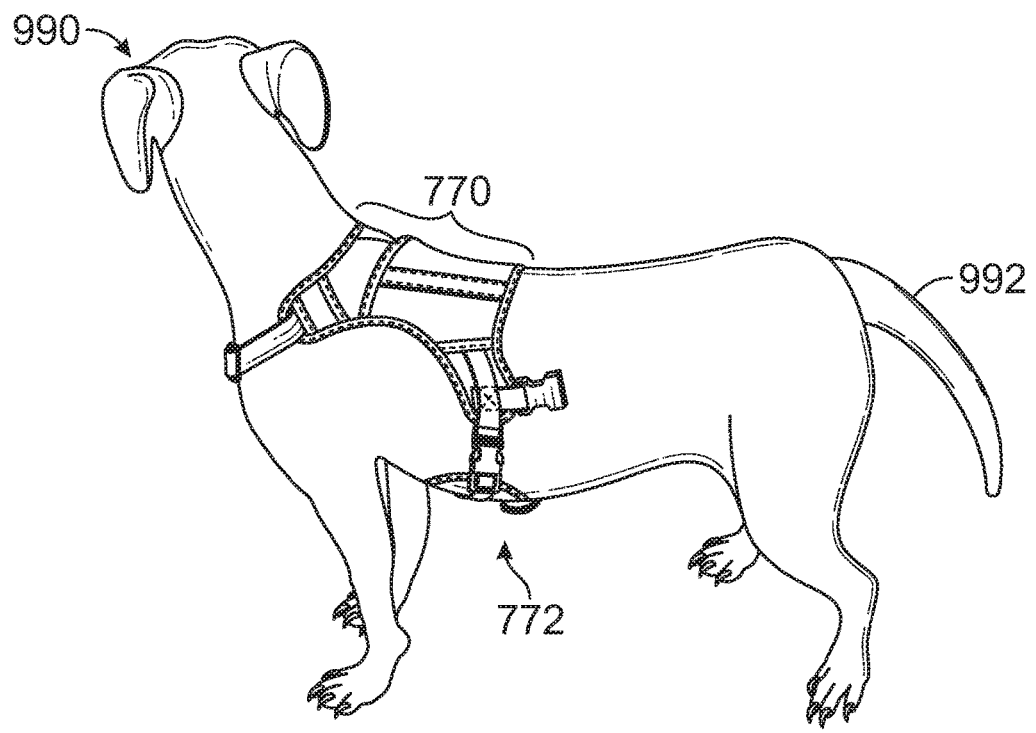
FIG. 1 is an example illustration of an embodiment of the tail protection device showing the dog wearer wearing a dog harness. The nadir area of the dog harness can also be seen.

Corresponding reference characters indicate corresponding components throughout the several views of the drawings. Skilled artisans will appreciate that elements in the figures are illustrated for simplicity and clarity and have not necessarily been drawn to scale. Also, common but well-understood elements that are useful or necessary in a commercially feasible embodiment are often not depicted to facilitate a less obstructed view of these various embodiments. Additionally, the disclosed architecture is sufficiently configurable, such that it may be utilized in ways other than what is shown.

DETAILED DESCRIPTION OF INVENTION

In this Specification, which includes the figures, claims, and this detailed description, reference is made to particular and possible features of the embodiments of the invention, including method steps. These particular and possible features are intended to include all possible combinations of such features, without exclusivity. For instance, where a feature is disclosed in a specific embodiment or claim, that feature can also be used, to the extent possible, in combination with and/or in the context of other aspects and embodiments of the invention, and in the invention generally. Additionally, the disclosed architecture is sufficiently configurable, such that it may be utilized in ways other than what is shown.

The purpose of the Abstract of this Specification is to enable the U.S. Patent and Trademark Office and the public generally, and especially the scientists, engineers and practitioners of the art who are not familiar with patent or legal terms or phrasing, to determine quickly from a cursory inspection the nature and essence of the technical disclosure of the application. The Abstract is not intended to be limiting as to the scope of the invention in any way.

In the following description, numerous specific details are given in order to provide a thorough understanding of the present embodiments. It will be apparent, however, to one having ordinary skill in the art, that the specific detail need not be employed to practice the present embodiments. On other instances, well-known materials or methods have not been described in detail in order to avoid obscuring the present embodiments. When limitations are intended in this Specification, they are made with expressly limiting or exhaustive language.

Reference throughout this Specification to "one embodiment", "an embodiment", "one example" or "an example" means that a particular feature, structure, or characteristic described in connection with the embodiment or example is included in at least one embodiment of the present embodiments. Thus, appearances of the phrases "in one embodiment", "according to an embodiment", "in an embodiment", "one example", "for example", "an example", or the like, in various places throughout this Specification are not necessarily all referring to the same embodiment or example. Furthermore, the particular features, structures, or characteristics may be combined in any suitable combinations and/or sub-combinations in one or more embodiments or examples.

The terms "comprises", "comprising", "includes", "including", "has", "having", "could", "could have" or their grammatical equivalents, are used in this Specification to mean that other features, components, materials, steps, etc. are optionally present as a non-exclusive inclusion. For instance, a device "comprising" (or "which comprises") components A, B, and C can contain only components A, B, and C, or can contain not only components A, B, and C but also one or more other components. For example, a method comprising two or more defined steps can be carried out in any order or simultaneously, unless the context excludes that possibility; and the method can include one or more other steps which are carried out before any of the defined steps, between two of the defined steps, or after all the defined steps, unless the context excludes that possibility.

Further, unless expressly stated to the contrary, "or" refers to an inclusive or and not to an exclusive or. For example, An embodiment could have optional features A, B, or C, so the embodiment could be satisfied with A in one instance, with B in another instance, and with C in a third instance, and probably with AB, AC, BC, or ABC if the context of features does not exclude that possibility.

Examples or illustrations given are not to be regarded in any way as restrictions on, limits to, or express definitions of any term or terms with which they are utilized. Instead, these examples or illustrations are to be regarded as being described with respect to one particular embodiment and as being illustrative only. Those of ordinary skill in the art will appreciate that any term or terms with which these example or illustrations are utilized will encompass other embodiments, which may or may not be given in this Specification, and all such embodiments are intended to be included within the scope of that term or terms. Language designating such nonlimiting examples and illustrations includes, but is not limited to "for example", "for instance", "etc.", "or otherwise", and "in one embodiment."

The phrase "at least" followed by a number is used to denote the start of a range beginning with that number, which may or may not be a range having an upper limit, depending on the variable defined. For instance, "at least 1" means 1 or more.

In this specification. "a" and "an" and similar phrases are to be interpreted as "at least one" and "one or more." In this specification, the term "may" or "can be" or "could be" is to be interpreted as "may, for example." In other words, the term "may" is indicative that the phrase following the term "may" is an example of one of a multitude of suitable possibilities that may, or may not, be employed to one or more of the various embodiments.

The phrase "a plurality of" followed by a feature, component, or structure is used to mean more than one, specifically including a great many, relative to the context of the component.

It is the applicant's intent that only claims that include the express language "means for" or "step for" be interpreted under 35 U.S.C. § 112. Claims that do not expressly include the phrase "means for" or "step for" are not to be interpreted under 35 U.S.C. § 112.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purpose required by law, but otherwise reserves all copyright rights whatsoever.

FIG. 1 is an example illustration of an embodiment of the tail protection device showing the dog wearer 990 with a dog harness 770 with a nadir area 772, and the tail of the dog wearer 992.

Figure 2:
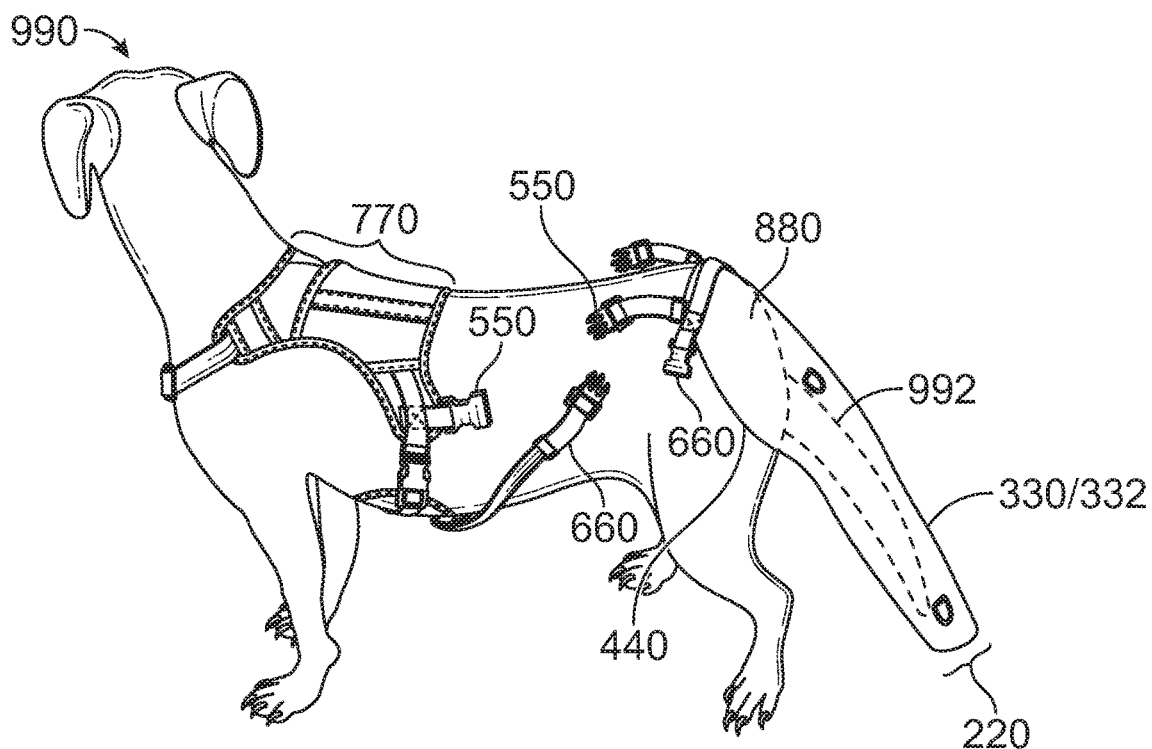
FIG. 2 is an example illustration of an embodiment of the tail protection device where the dog wearer is wearing a dog harness that is yet to be connected to the tail sleeve, which includes a rump cover, and whose tip-covering end is longer than the tail of the dog wearer, by using at least two lateral straps and at least one medial strap.

FIG. 2 is an example illustration of an embodiment of the tail protection device on a dog wearer 990, which is comprised of a tail sleeve 220, at least two lateral straps 550, at least one medial strap 660, and a dog harness 770. The tail sleeve 220 has a tip covering end 330 which is longer than the tail of the dog wearer 332. The tail sleeve which covers the tail of the dog wearer 992 is also attached to the rump cover 880 on the rump of the dog wearer 990.

Figure 3:
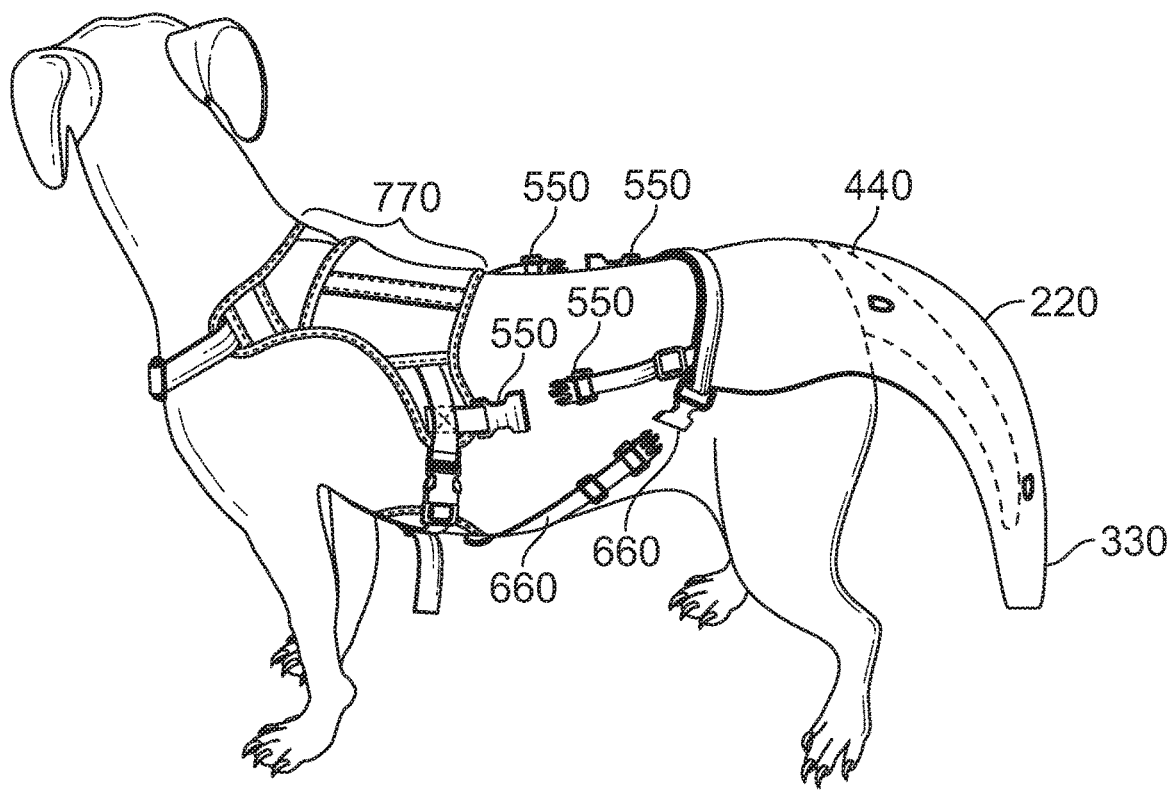
FIG. 3 is an example illustration of an embodiment of the tail protection device where the dog wearer is wearing a dog harness that has not yet been connected to the tail sleeve with a base end and a tip-covering end, by using at least two lateral straps and at least one medial strap.

FIG. 3 is an example illustration of an embodiment of the tail protection device, which is comprised of a tail sleeve 220, at least two lateral straps 550 and at least one medial strap 660, which are about to be connected to a dog harness 770. The tail sleeve 220 has a base end 440 and a tip covering end 330 which covers the tip of the dog wearer's tail, which is shorter than the tip covering end 330 of the tail sleeve.

Figure 4:
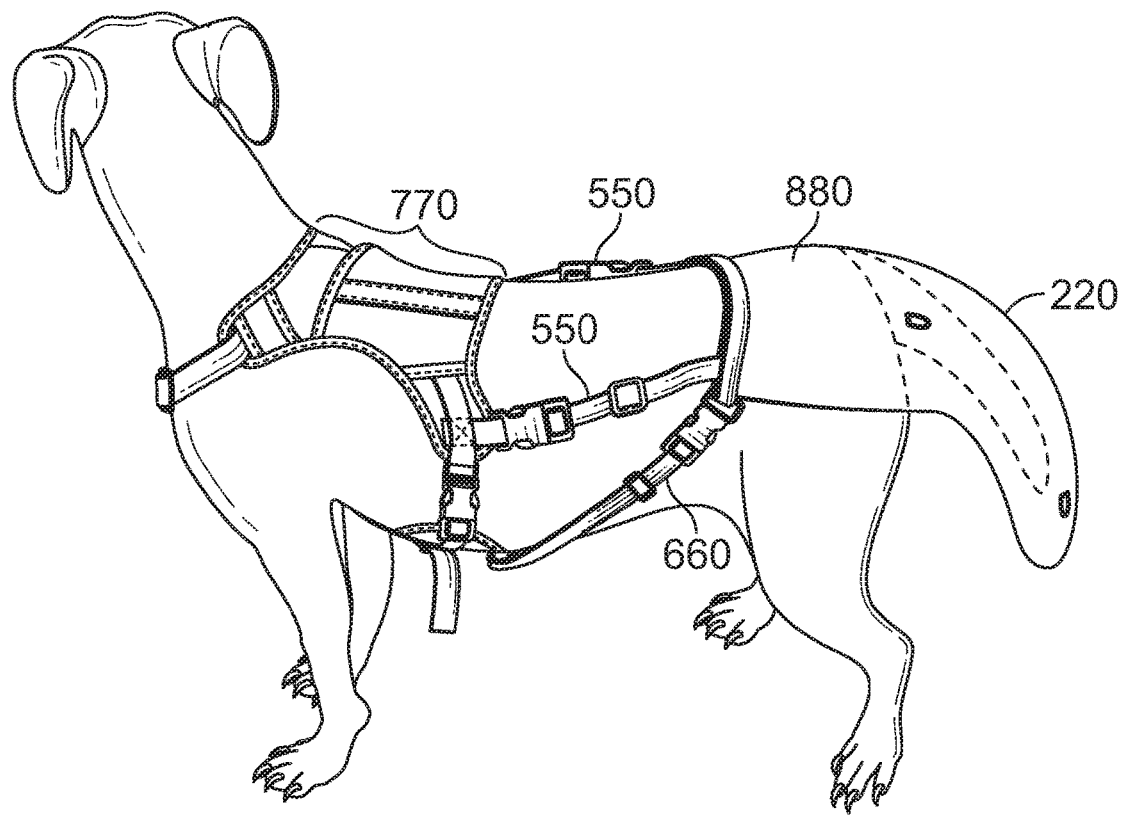
FIG. 4 is an example illustration of an embodiment of the tail protection device where the dog wearer is wearing a dog harness which is connected to the tail sleeve with a rump cover by using at least two lateral straps on either side of the dog wearer's body and at least one medial strap in the nadir area of the dog harness.

FIG. 4 is an example illustration of an embodiment of the tail protection device showing the dog harness 770 on a dog wearer's body connected to the rump cover 880 and the tail sleeve 220 with at least two lateral straps 550 on the sides of the dog wearer's body and at least one medial strap 660 which is connected in the nadir area of the dog harness.

Figure 5:
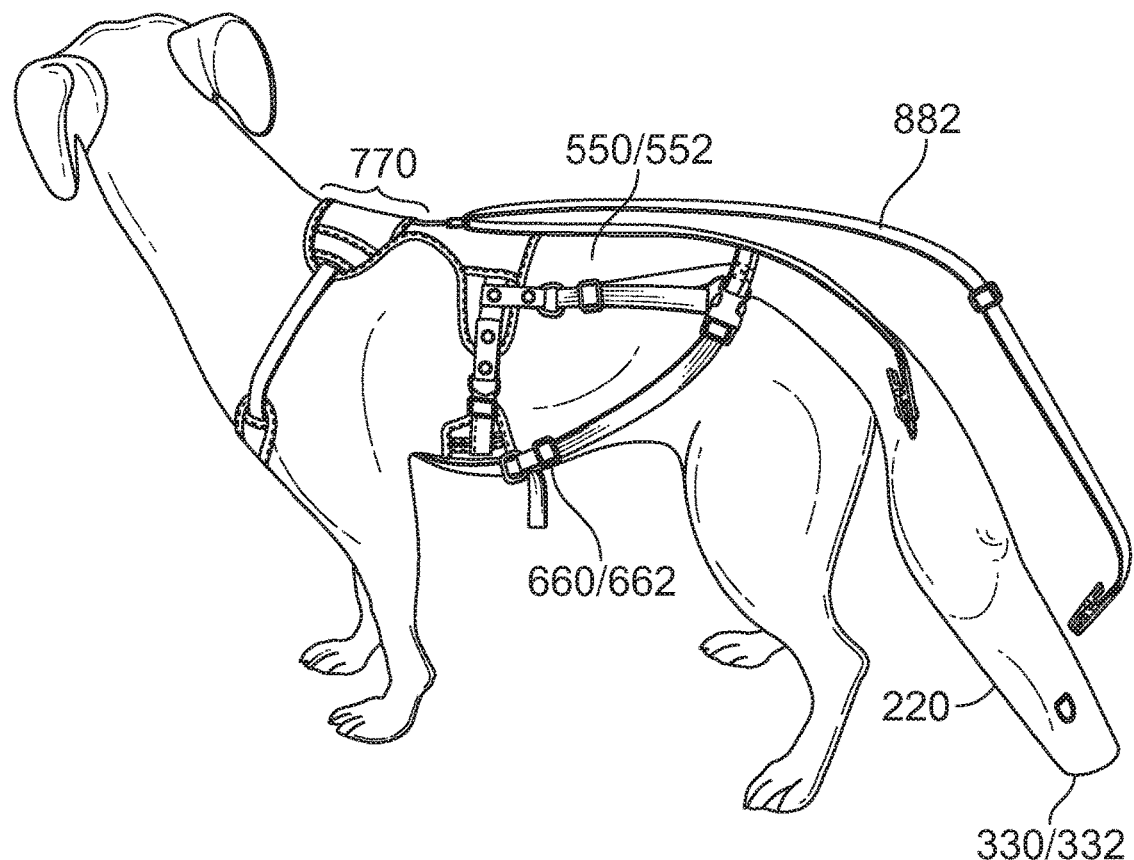
FIG. 5 is an example illustration of an embodiment of the tail protection device where the dog wearer is wearing a dog harness which is connected to the at least two lateral straps and at least one medial strap, and a restriction strap. The at least two lateral straps and at least one medial strap is connected to form a snug fit to the tail of dog wearer at base end of tail sleeve. Here, the tip-covering end of the tail sleeve of the tail protection device is longer than the tail of the dog wearer.

FIG. 5 is an example illustration of an embodiment of the tail protection device showing the dog harness 770 connected to the tail sleeve 220 where the tip-covering end of tail sleeve 330 is longer than the tail of a dog wearer 332 with permanently connected 552 at least two lateral straps 550 and at least one medial strap 660 which connects in the nadir area of the dog harness 662. The dog harness is further connected to at least one restriction strap 882.

Figure 6:
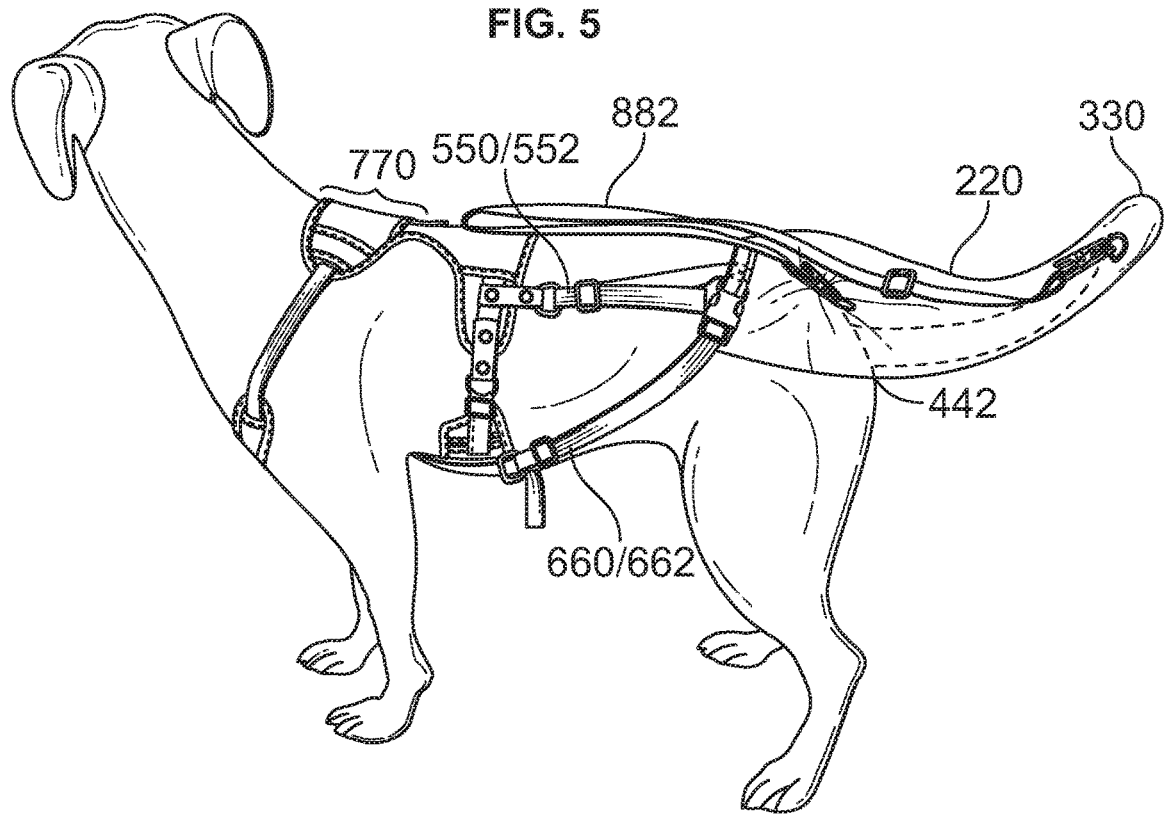
FIG. 6 is an example illustration of an embodiment of the tail protection device where the dog wearer is wearing the tail sleeve with a rump cover, which is connected to the dog harness of the dog wearer by using at least two lateral straps, at least one medial strap, and a restriction strap.

FIG. 6 is an example illustration of an embodiment of the tail protection device showing the dog harness 770 connected to the tail sleeve 220 with a tip covering end 330 by permanently connected 552 at least two lateral straps 550, at least one medial strap 660 which is connected in the nadir area of the dog harness 662, and the restriction strap 882 is connected to the dog harness 770 on one end and to the tip-covering end of the tail sleeve 330 on the other end. The tail sleeve 220 is connected to the dog wearer by forming a snug fit to the tail of the dog wearer at base end of the tail sleeve 442.

Figure 7:
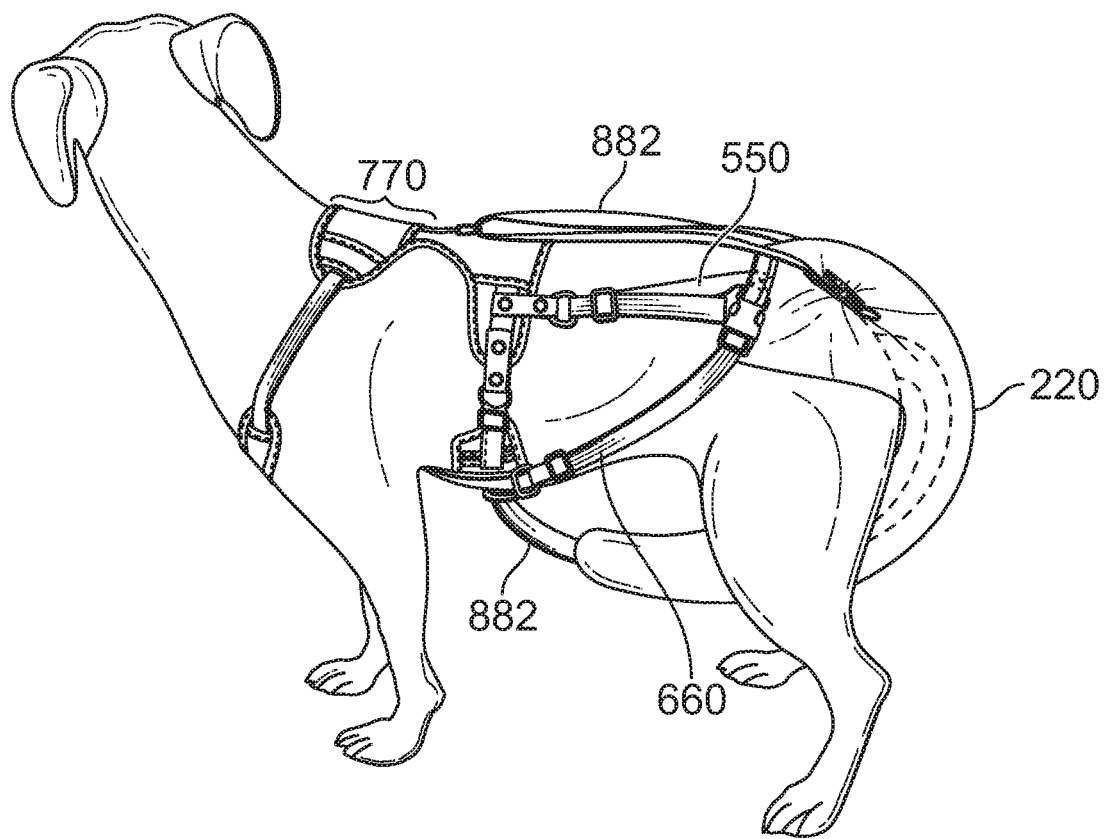
FIG. 7 is an example illustration of an embodiment of the tail protection device where the dog wearer is wearing the tail protection device with a tail sleeve and a rump cover, which is connected to the dog harness of the dog wearer by using at least two lateral straps, at least one medial strap, and a restriction strap.

FIG. 7 is an example illustration of an embodiment of the tail protection device showing the dog harness 770 connected to the tail sleeve 220 by at least two lateral straps 550 and at least one medial strap 660. The dog harness is further connected to at least one restriction strap 882.

Figure 8:
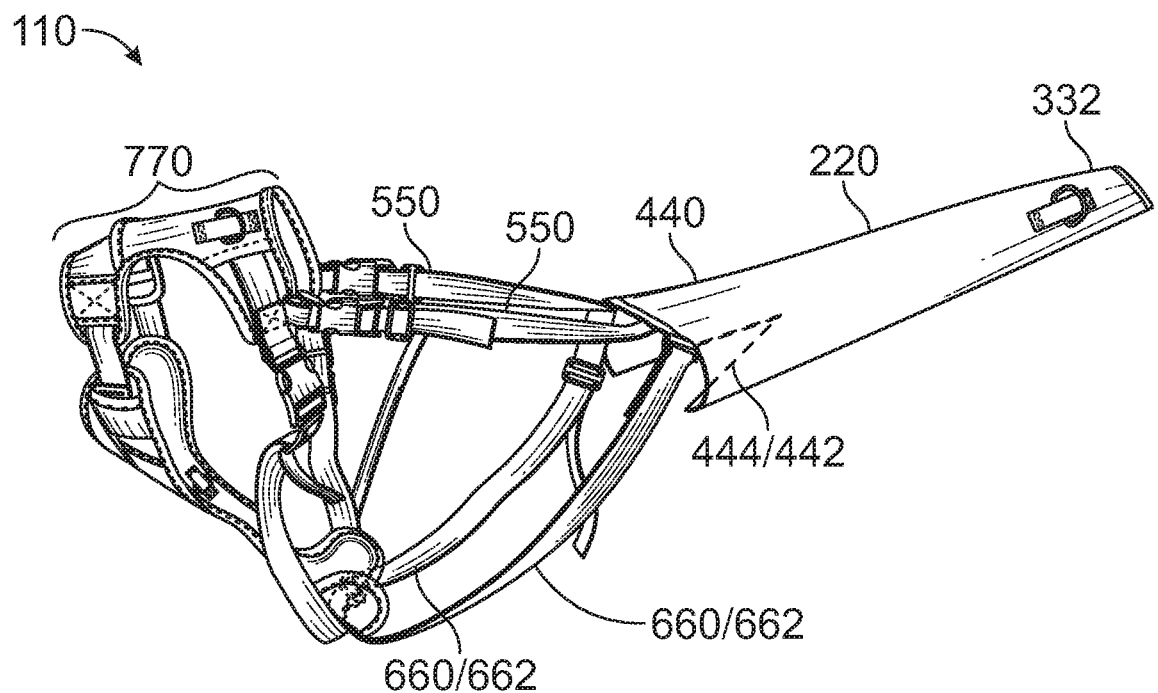
FIG. 8 is a front perspective view of an embodiment of the tail protection device with a tail sleeve where the tip covering end of the tail sleeve is longer than a tail of a dog wearer connected to the dog harness, by using at least two lateral straps and at least one medial strap which connects in the nadir area of the dog harness. The 'v' opening in base end of the tail sleeve can also be seen.

FIG. 8 is a front perspective view of an embodiment of the tail protection device 110, showing the dog harness 770 connected to the tail sleeve 220 which is made of relatively soft material by attaching at least two lateral straps 550 and at least one medial strap 660 which is further attached in the nadir area of the dog wearer 662 to the tail sleeve with a base end 440, and a tip-covering end which is longer than the tail of the dog wearer 332. The base end of the tail sleeve 440 is snug fit to the tail of the dog wearer 442 with the help of the 'v' opening in the base end of tail sleeve 444.

Figure 9A:
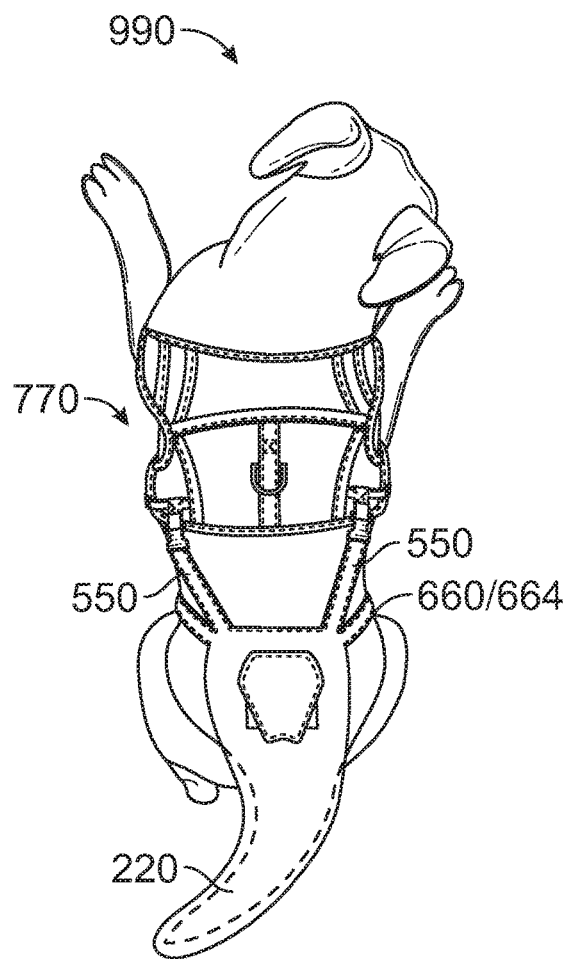
FIG. 9A is an example illustration of an embodiment of the tail protection device showing a dog wearer in a sitting position, wearing a dog harness which is connected to the tail sleeve by at least two lateral straps and at least one medial strap.

FIG. 9A is an example illustration of an embodiment of the tail protection device showing the dog wearer 990 with a dog harness 770 which is connected to the tail sleeve 220 by at least two lateral straps 550 along the sides of the dog wearer and at least one medial strap 660 around the waist of the dog wearer 664.

Figure 9B:
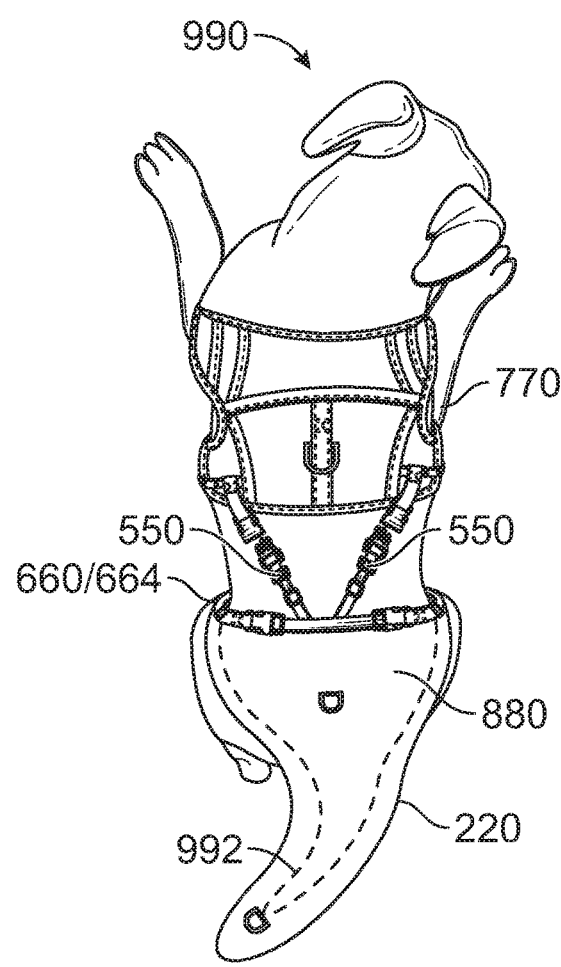
FIG. 9B is an example illustration of an embodiment of the tail protection device showing a dog wearer in a sitting position, wearing a dog harness which is connected to the tail sleeve with a rump cover by at least two lateral straps which are connected along the sides of the dog wearer's body and at least one medial strap which is connected around the waist of the dog wearer.

FIG. 9B is an example illustration of an embodiment of the tail protection device showing the dog wearer 990 with a dog harness 770 which is connected to the rump cover 880 of the tail sleeve 220 which protects the tail of the dog wearer 992 by at least two lateral straps 550 along the sides of the dog wearer and at least one medial strap 660 around the waist of the dog wearer 664.

Figure 9C:
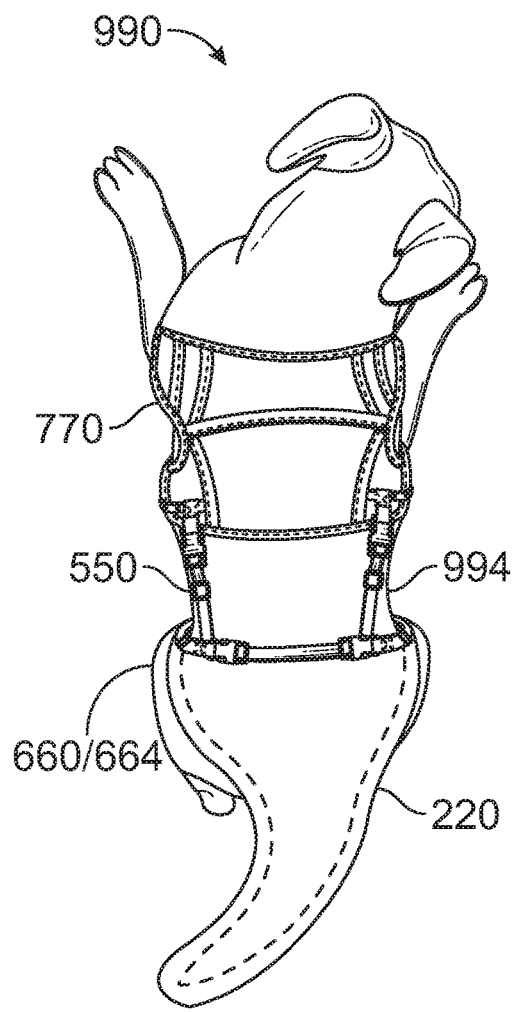
FIG. 9C is an example illustration of an embodiment of the tail protection device showing a dog wearer in a sitting position, wearing a dog harness which is connected to the tail sleeve by at least two lateral straps and at least one medial strap which is connected around the waist of the dog wearer.

FIG. 9C is an example illustration of an embodiment of the tail protection device showing the dog wearer 990 with a dog harness 770 which is connected to the tail sleeve 220 by at least two lateral straps 550 along the sides of the dog wearer and at least one medial strap 660 connected around the waist of the dog wearer 664/994.

Figure 9D:
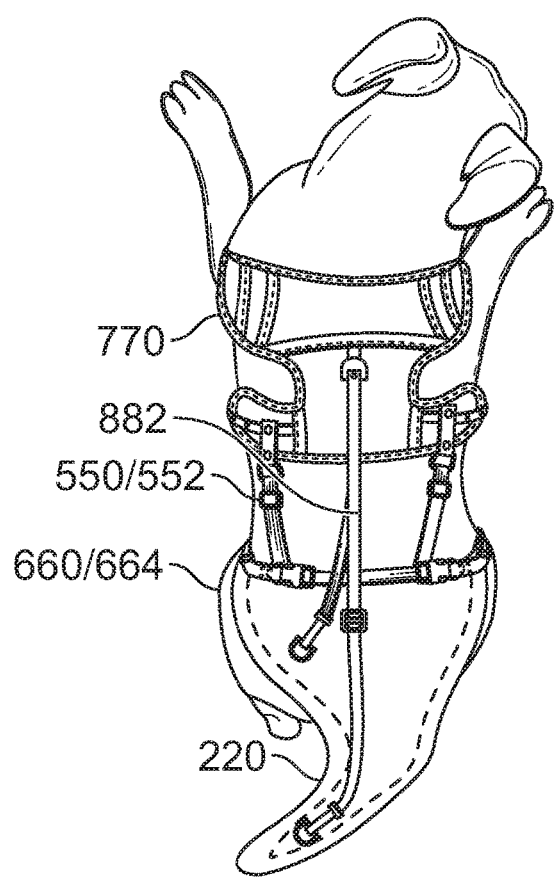
FIG. 9D is an example illustration of an embodiment of the tail protection device showing a dog wearer in a sitting position, wearing a dog harness which is connected to the tail sleeve by at least two lateral straps and at least one medial strap which is connected around the waist of the dog wearer. A restriction strap connected to the dog harness can also be seen.

FIG. 9D is an example illustration of an embodiment of the tail protection device showing the dog wearer with a dog harness 770 which is securely connected to the tail sleeve 220 by permanently connected 552 at least two lateral straps 550 on either side of the dog wearer's body and at least one medial strap 660 which connects in nadir area of the dog harness 664. At least one restriction strap 882 is also connected to the dog harness on one end and the tail sleeve on the other and can be used to limit the dog wearer's movement.

Figure 10:
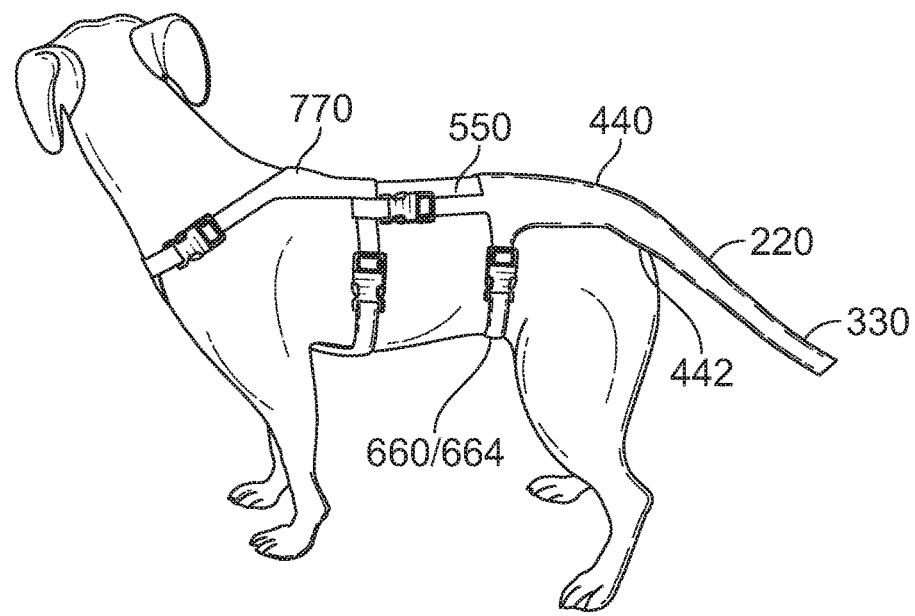
FIG. 10 is an example illustration of an embodiment of the tail protection device showing a side view of a dog wearer wearing a tail protection device comprising of a tail sleeve with a tip covering end and a base end, and which is connected to the dog harness by at least two lateral straps along the sides of the dog wearer and at least one medial strap around the waist of the dog wearer.

FIG. 10 is an example illustration of an embodiment of the tail protection device showing a side view of a dog wearer wearing the completely assembled tail protection device where the dog harness 770 is connected to the tail sleeve 220 at the base end of the tail sleeve 440 by at least two lateral straps 550 on either side of the dog wearer's body and at least one medial strap 660 which is connected around the waist of the dog wearer 664. The tip-covering end of the tail sleeve 330 can also be seen.

Figures 11, 12:
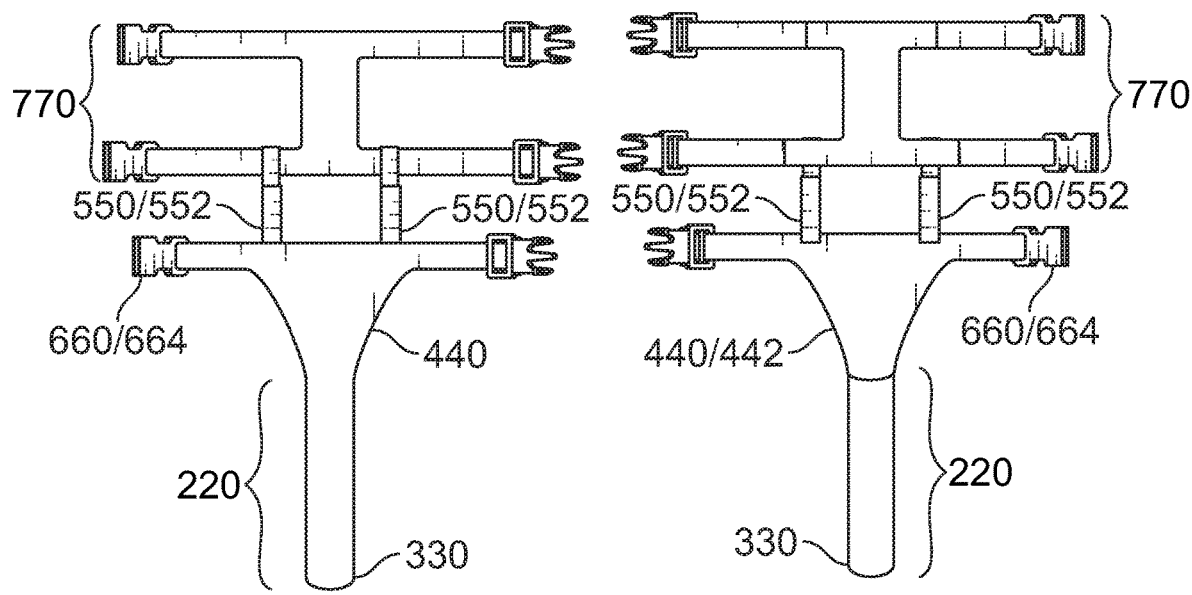
FIG. 11 is a perspective view of an embodiment of the tail protection device showing the dog harness connecting to the tail sleeve with a base end and a tip covering end, by at least two lateral straps which are permanently connected and at least one medial strap which either connects to the nadir area of the dog harness or the waist of the dog wearer.
FIG. 12 is a perspective view of an embodiment of the tail protection device showing the dog harness connecting to the tail sleeve with a base end of the tail sleeve which is used to form a snug fit to the tail of a dog wearer and a tip covering end of the tail sleeve, by at least two lateral straps which are permanently connected and at least one medial strap which either connects to the nadir area of the dog harness or the waist of the dog wearer.

FIG. 11 is a perspective view of an embodiment of the tail protection device showing the assembled components of the tail protection device. It shows the dog harness 770 connected to the tail sleeve 220 with a tip-covering end 330. The dog harness 770 is connected to at least two lateral straps 550 which can be permanently connected 552 and at least one medial strap 660 which connects around the waist of the dog wearer 664. The at least two lateral straps 550 which can be permanently connected 552 and at least one medial strap 660 are further connected to the base end of the tail sleeve 440.

FIG. 12 is a perspective view of an embodiment of the tail protection device showing the assembled components of the tail protection device. It shows the reverse side of the tail protection device shown in FIG. 11. It shows the dog harness 770 connected to the tail sleeve 220 with a tip-covering end 330. The dog harness 770 is connected to at least two lateral straps 550 which can be permanently connected 552 and at least one medial strap 660 which connects around the waist of the dog wearer 664. The at least two lateral straps 550 which can be permanently connected 552 and at least one medial strap 660 are further connected to the base end of the tail sleeve 440 and form a snug fit to tail of the dog wearer at base end of tail sleeve 442.

Figure 13A:
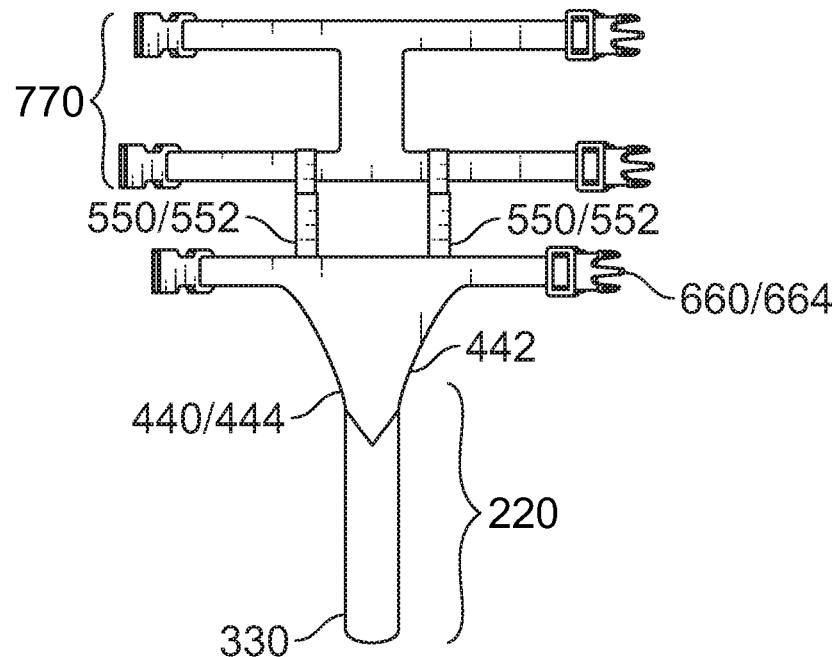
FIG. 13A is a perspective view of an embodiment of the tail protection device showing the dog harness connecting to the a tail sleeve with a base end and a tip covering end, by at least two lateral straps which are permanently connected and at least one medial strap which either connects to the nadir area of the dog harness or the waist of the dog wearer. The base end of the tail sleeve can be seen with a 'v' opening which is used to form a snug fit to tail of the dog wearer.

FIG. 13A is a perspective view of an embodiment of the tail protection device showing the assembled components of the tail protection device. It shows the dog harness 770 connected to the tail sleeve 220 with a tip-covering end 330. The dog harness 770 is connected to at least two lateral straps 550 which can be permanently connected 552 and at least one medial strap 660 which connects around the waist of the dog wearer 664. The at least two lateral straps 550 which can be permanently connected 552 and at least one medial strap 660 are further connected to the base end of the tail sleeve 440, with a 'v' opening in base end of tail sleeve 444 and form a snug fit to tail of the dog wearer at base end of tail sleeve 442.

Figure 13B:
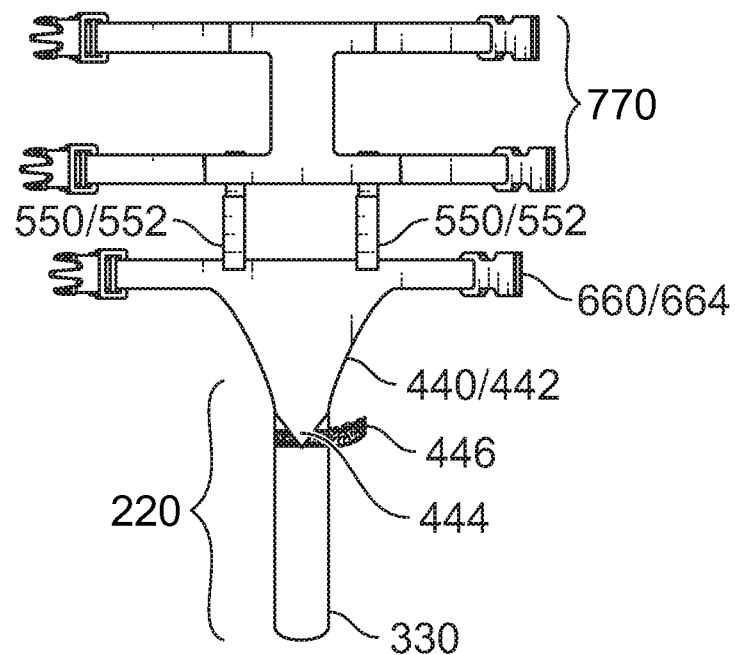
FIG. 13B is a perspective view of an embodiment of the tail protection device showing the dog harness connecting to the tail sleeve with a base end and a tip covering end, by at least two lateral straps which are permanently connected and at least one medial strap which either connects to the nadir area of the dog harness or the waist of the dog wearer. The base end of the tail sleeve can be seen with a 'v' opening, and a closure for the 'v' opening and are used to form a snug fit to tail of the dog wearer.

FIG. 13B is a perspective view of an embodiment of the tail protection device showing the assembled components of the tail protection device. It shows the dog harness 770 connected to the tail sleeve 220 with a tip-covering end 330. The dog harness 770 is connected to at least two lateral straps 550 which can be permanently connected 552 and at least one medial strap 660 which connects around the waist of the dog wearer 664. The at least two lateral straps 550 which can be permanently connected 552 and at least one medial strap 660 are further connected to the base end of the tail sleeve 440, with a 'v' opening in base end of tail sleeve 444 and form a snug fit to tail of the dog wearer at base end of tail sleeve 442 by using the closure for 'v' opening in base end of tail sleeve 446.

This Specification will now proceed to describe in detail the elements of the embodiments of the invention.

Tail Protection Device 110 means a device that covers and secures the tail of a dog to prevent damage or further damage to the tail by restricting the tail's movement. Unlike other animals with tails, it is not uncommon for dogs to injure their tail with vigorous wagging and hitting their tail on objects. Such wagging and hitting can break bones, bruise muscles and ligaments, and cause open sores and chronic bleeding. Severe cases can result in amputation. The tail protection device helps protect the tails from further damage from these sorts of injuries.

Tail Sleeve 220 means a sleeve that fits on the tail of the dog wearer. The dimensions of this tail sleeve can be customized to suit a variety of shapes and sizes of dog tails. This tail sleeve is comprised of two ends—one is a base end which goes around the base area of the tail of a dog wearer, i.e., where the tail connects to the dog's body or rump. The other end of the tail sleeve is the tip-covering end which is towards and around the tip or end of the dog wearer's tail. The tail sleeve can be slid over the tail of the dog wearer, as can be seen in the embodiments shown in the drawings. However, a person ordinarily skilled in the art would know that the tail sleeve can also wrap around the sleeve with the help of some type of fasteners, but the fasteners would be limited to things that a dog could not dismantle (Velcro®) or easily choke on (a button).

Relatively Soft Material (of the tail sleeve) means soft, flexible material that can keep the dog comfortable by covering the entire tail while offering sufficient protection and resistance when a tail wags to prevent injuries from vigorous tail wagging. The relatively soft material also allows the dog to sit and lay normally while healing. Examples of relatively soft material include breathable mesh, polyester blends, cotton, rubber, silicone, and any other common materials.

Tip-Covering End of Tail Sleeve 330 means the end of the tail sleeve which covers the narrow tail tip of the dog wearer, thereby protecting the tip of the dog wearer's tail. It however is not a specifically demarked area. A tip-covering end is essentially one side of the tail sleeve (opposite the base end) and is only being used as a term to describe different areas of the sleeve for ease of understanding. However, a person ordinarily skilled in the art would know that the tip covering end of the tail sleeve is the tail sleeve itself and not a different component.

(Tip-Covering End of Tail Sleeve) Longer Than a Tail of a Dog Wearer 332 means the tip of the tail sleeve is longer than the tail of the dog wearing the tail sleeve, thereby completely and comfortably encapsulating the tail of the dog wearing the tail sleeve or tail protection device, thereby effectively protecting the wearer dog wearer's tail.

Base End of Tail Sleeve 440 means the end of the tail sleeve that is nearest to the rump of the dog wearer, opposite of the tip-covering end. It is not a specific demarked area of the tail sleeve. It merely describes a region/side of sleeve for ease of description. A person who is ordinarily skilled in the art would know that the base end of the tail sleeve is the tail sleeve itself and not a different component.

Snug Fit to Tail of Dog Wearer at Base End of Tail Sleeve 442 means the base end of the tail sleeve comfortably yet, tightly fits on to the tail of the dog wearer, to reduce a chance that the tail sleeve accidentally comes off when the dog wearer moves. The snug fit could be from force or pressure by the lateral and medial straps against a dog's body or rump, and/or the circumference of the sleeve is tight around the actual tail. Comfort of the tail sleeve depends on the type of the dog, so either snug fit is included in basic feature. A breed with a cropped/docked tail, for example, would likely need the sleeve to be tight around the circumference to reduce slipping.

'V' Opening in Base End of Tail Sleeve 444 means an opening which provides space to close any gaps and provide snug fit of the tail sleeve and/or bring the sleeve up higher on the tail to make a snug fit. This reduces any wiggle room a dog wearer may have and secures the tail protection device on the dog wearer. In the embodiments presented, this is located on the underside of the sleeve (near the anus of a dog wearer), but a v-opening on the side or top/rump side of the sleeve is possible is less efficient.

Closure for 'V' Opening in Base End of Tail Sleeve 446 means an added closure where the user can clinch the space and provide an additional element to the snug fit of the tail protection device. This closure adds an extra circumference force which aides in providing a snug fit to the dog wearer. Common closure materials include hook and loop type fasteners, button type fasteners, sticky adhesive back straps, and other common closure materials used by people. Since dogs generally are not able to reach their anuses, the material is at lower risk of being a choking hazard and can be more convenient for the user.

Lateral Straps (at least two) 550 means straps that run along the sides of the dog wearer. These straps connect the tail sleeve of the tail protection device to the dog harness on the torso of the dog wearer's body. The lateral straps are not necessarily permanently closed and could be detachable at either the tail sleeve side or the dog harness sides. The lateral straps can be temporarily closed by using adjustable straps, snaps on either end, hook and loop type fasteners, button type fasteners, sticky adhesive back straps and other type of common closures or clasps. Examples of common fabrics or materials that can be used to make the lateral straps include cotton, faux leather, leather, rubber, silicone, polyester blend, and any other common materials. They may start close to the spine of the dog wearer on the tail sleeve, but the important feature us that the straps run along the sides or ribs of the dog to the sides of the dog harness to apply a lateral and forward force to the sleeve from the harness. The lateral straps allow the dog harness to hold and apply force to the sleeve to keep it in place.

Permanently Connected (lateral straps) 552 means the lateral straps that permanently connect the dog harness to the tail protection device on the dog wearer's body, until such time as it is voluntarily removed by the user. Methods to permanently connect the lateral straps include sewing, fusing, continuous fabric/material and other common means that are employed by people to permanently connect fabric or other common materials. The permanently connected lateral straps can still be adjustable.

Medial Strap (at least one) 660 means a strap that runs along the median or middle plane of the dog wearer's body which further secures the tail sleeve to the dog wearer's body. The medial straps utilize the waistline of a dog to apply a downward force, either by connecting the button/nadir part of the dog harness, or by wrapping around the waist. The gender of the dog is a factor in which type of medial strap/s to use. Examples of common fabrics or materials that can be used to make the medial strap include cotton, faux leather, leather, rubber, silicone, polyester blend, and any other common materials used by people.

(Medial Strap) Connects in Nadir Area of the Dog Harness 662 means the strap that runs along the waistline of the dog wearer's torso (as opposed to the rib cage), and connects the tail sleeve to the bottom of the dog harness. This provides a downward force on the tail sleeve to hold the tail sleeve in place. The medial strap can be attached to the dog harness by using snaps on either end or hook and loop type fasteners, button type fasteners, sticky adhesive back straps and other type of common closures or clasps.

(Medial Strap) Connects Around the Waist of the Dog Wearer 664 means the strap that runs along the waistline of the dog wearer's torso to secure the tail sleeve from sliding up and the tail coming free of the tail sleeve. The medial strap can be attached to the waist of the dog wearer by using snaps on either end or hook and loop type fasteners, button type fasteners, sticky adhesive back straps and other type of common closures or clasps.

Dog Harness 770 means a common dog harness or a specific one that can be used to connect to the tail sleeve by way of the at least two lateral straps. A common definition of the dog harness includes a combination of straps, bands, and other parts forming the working gear of a dog. Common dog harnesses are used to secure or anchor a dog, but there are many variations available on the market. Some variations of a dog harness can be seen in the drawings. The harness provides the anchoring force to secure the tail sleeve. Harnesses are commonly used for leashing dogs, for buckling them into car seats, and securing them to other objects for their safety. The success of the common harness is most effective when the harness can deliver the restraining force (like if the dog pulls on a leash or is in a car accident) evenly across the chest and shoulders of the dog to reduce the amount of injury.

Nadir Area 772 means the lowest point on the dog harness when oriented as it would be worn on a dog. A common definition of nadir is the lowest point.

Rump Cover 880 means part of the tail sleeve that goes over the rump of a dog wearer's body. This rump cover is more pronounced in some embodiments of the tail protection device, which is beneficial for longer-tailed breeds to give more coverage and security with additional fabric/material that allows a corresponding amount to looseness or 'wiggle room' to prevent injuries from the tail sleeve being too restrictive when sitting or other activities.

Restriction Strap (at least one) 882 means a strap that connects to the dog harness and is used to restrict the dog wearer's movement. Two kinds of restriction straps can be used. The first kind is to pull the tail up and out of the way as can be seen in FIG. 5. This kind of strap can be used when the dog is defecating. The second kind of restriction strap goes in between legs for temporary extra mobility so the dog could sit comfortably in a small space. This kind of strap can be seen in FIG. 9D.

Dog Wearer 990 means the dog wearing the tail protection device.

Tail of Dog Wearer 992 means the tail of the dog wearing the tail protection device.

Waist of Dog Wearer 994 means the waist of the dog wearing the tail protection device.

One embodiment example is a tail protection device made up of: a tail sleeve, at least two lateral straps, at least one medial strap, and a dog harness. In this embodiment, the tail sleeve, which is made of a relatively soft material is connected to at least two lateral straps and at least one medial strap. The tail sleeve of this embodiment further has a base end and a tip-covering end. The tip covering end of the tail sleeve is longer than the tail of the dog wearer, who is the dog wearing the fully assembled tail protection device. The base end of the tail sleeve makes a snug fit to the tail of the dog wearer. The at least two lateral straps and at least one medial strap which are connected to the dog harness on one end, are further connected to the tail sleeve on the other end. The at least one medial strap of this embodiment is capable of being attached either in a nadir area of the dog harness or around the waist of the dog wearer.

A second embodiment example is the tail protection device of the previous embodiment, but where the at least one medial strap is two medial straps, and both the medial straps connect from the tail sleeve to the nadir area of the dog harness.

A third embodiment example is the tail protection device of the second embodiment, but where the dog harness is further integrated into the tail protection device in that the at least two lateral straps permanently connect the dog harness to the tail sleeve.

A fourth embodiment example is the tail protection device of the third embodiment, where the tail protection device further includes a rump cover.

A fifth embodiment example is the tail protection device of the fourth embodiment where the snug fit at the base end of the tail sleeve further includes a 'v' opening.

A sixth embodiment example is the tail protection device of the fifth embodiment where the 'v' opening at the base end of the tail sleeve further includes a closure.

A seventh embodiment example is the tail protection device of the first embodiment, but where the at least one medial strap is a medial strap that connects around the waist of the dog wearer instead of the nadir of the dog harness.

An eighth embodiment example is the tail protection device of the seventh embodiment, where the dog harness is integrated into the tail protection device by using at least two latera; straps which permanently connect the dog harness to the tail sleeve.

A ninth embodiment example is the tail protection device of the eighth embodiment, where the tail protection device further includes a rump cover.

A tenth embodiment example is the tail protection device of the ninth embodiment where the snug fit at the base end of the tail sleeve further includes a 'v' opening.

An eleventh embodiment example is the tail protection device of the tenth embodiment where the 'v' opening at the base end of the tail sleeve further includes a closure.

By example, a method for making a tail protection device, comprising the steps of: making a tail sleeve with relatively soft material with a base end and a tip covering end, making the tail sleeve longer than the tail of the dog wearer at the tip-covering end, making a snug fit to the tail of the dog wearer at the base end of the tail sleeve, making the tail sleeve connect to the at least two lateral straps and at least one medial strap, making the at least two lateral straps connect to the dog harness, making the at least one medial strap connect either nadir to the dog harness or around the waist of the dog wearer.

A second method for making the tail protection device using the first method further includes making at least one medial strap as two medial straps, making the two medial straps connect the tail sleeve to the nadir area of the dog harness, making the at least two lateral straps connect the dog harness permanently to the tail sleeve, and making the tail protection device include a rump cover.

A third method for making the tail protection device using the second method further includes making a snug fit at the base end of the tail sleeve include a 'v' opening, and making 'v' opening on the base end of the tail sleeve include a closure A fourth method for making the tail protection device using the second method further includes making the at least one medial strap as one medial strap, making the one medial strap connect around the waist of the dog wearer, making the at least two lateral straps connect the dog harness permanently to the tail sleeve, and making the tail protection device include a rump cover.

A fifth method for making the tail protection device using the fourth method further includes making the snug fit at the base end of the tail sleeve include a 'v' opening and making the 'v' opening on the base end of the tail sleeve include a closure.

A method of using the tail protection device of the first embodiment includes placing the tail sleeve over the tail so that the tip-covering end of the tail sleeve is over the end of the dog wearer's tail and the base end of the tail sleeve is closer to the rump of the dog wearer, forming a snug fit to the dog wearer's tail using the base end of the tail sleeve, connecting the tail sleeve to the at least two lateral straps and at least one medial strap, connecting the at least two lateral straps of the tail sleeve to the dog harness, and connecting the at least one medial strap in either the nadir area of the dog harness or around the waist of the dog wearer, thereby securing the tail protection device on the dog wearer.

A method of using the tail protection device of the fourth embodiment includes placing the rump cover of the tail protection device over the rump area of a dog wearer, placing the dog harness on the dog wearer, securing the dog harness to the dog wearer, fastening the two medial straps to the nadir area of the fog harness, and connecting the two medial straps from the tail sleeve to the nadir area of the dog harness.

A method of using the tail protection device of the sixth embodiment includes using the 'v' opening on the base end of the tail sleeve to form a snug fit to base of the tail of the dog wearer, and securing the closure at the 'v' opening on the base end of the tail sleeve.

A method of using the tail protection device of the ninth embodiment includes placing the rump cover of the tail protection device over the rump area of a dog wearer, placing the dog harness on the dog wearer, securing the dog harness to the dog wearer, fastening the two medial straps to the nadir area of the fog harness, and connecting the two medial straps from the tail sleeve around the waist of the dog wearer.

A method of using the tail protection device of the eleventh embodiment includes using the 'v' opening on the base end of the tail sleeve to form a snug fit to base of the tail of the dog wearer, and securing the closure at the 'v' opening on the base end of the tail sleeve.

What is claimed is:

1. A tail protection device, comprising:
a tail sleeve, at least two lateral straps, at least one medial strap, and a dog harness;
the tail sleeve is connected to the at least two lateral straps and the at least one medial strap,
the tail sleeve being of a relatively soft material, and
the tail sleeve having a base end and a tip-covering end,
the tail sleeve configured to be longer than a tail of the dog wearer such that the tip-covering end extends past the end of the tail, the sleeve configured to make a snug fit to the tail of the dog wearer at the base end of the tail sleeve, the snug fit includes a 'v' opening, and the 'v' opening on the base end of the tail sleeve includes a closure;
the at least two lateral straps of the tail protection device connect the tail sleeve to the dog harness;
the at least one medial strap of the tail protection device is two medial straps, and the two medial straps connect from the tail sleeve to the nadir area of the dog harness;
the dog harness is integrated into the tail protection device in that the at least two lateral straps permanently connect the dog harness to the tail sleeve; and
the tail protection device includes a rump cover.

2. A tail protection device, comprising:
a tail sleeve, at least two lateral strap, at least one medial strap, and a dog harness;
the tail sleeve is connected to the at least two lateral straps and the at least one medial strap,
the tail sleeve being of a relatively soft material, and
the tail sleeve having a base end and a tip-covering end,
the tail sleeve configured to be longer than a tail of the dog wearer such that the tip-covering end extends past the end of the tail, and the base end of the tail sleeve configured to make a snug fit to the tail of the dog wearer;
the at least two lateral straps of the tail protection device connect the tail sleeve to the dog harness;
the at least one medial strap is one medial strap that connects around the waist of the dog wearer;
the dog harness is integrated into the tail protection device in that the at least two lateral straps permanently connect the dog harness to the tail sleeve;
the tail protection device includes a rump cover;
the snug fit at the base end of the tail sleeve includes a 'v' opening; and
the 'v' opening on the base end of the tail sleeve includes a closure.

3. A method of making a tail protection device, comprising:
making a tail sleeve,
making the tail sleeve of a relatively soft material,
making the tail sleeve with a base end and a tip-covering end,
making the tail sleeve longer than a tail of a dog wearer at the tip-covering end,
making a snug fit to the tail of the dog wearer at the base end of the tail sleeve,
making the tail sleeve connect to at least two lateral straps and at least one medial strap,
making the at least two lateral straps of the tail sleeve connect to a dog harness, and
making the at least one medial strap as two medial straps,
making the two medial straps connect the tail sleeve to the nadir area of the dog harness,
making the at least two lateral straps connect the dog harness permanently to the tail sleeve, and
making the tail protection device include a rump cover
making the snug fit at the base end of the tail sleeve include a 'v' opening,
making the 'v' opening on the base end of the tail sleeve include a closure.

4. A method of making a tail protection device, comprising:
making a tail sleeve,
making the tail sleeve of a relatively soft material,
making the tail sleeve with a base end and a tip-covering end, making the tail sleeve longer than a tail of a dog wearer at the tip-covering end, making a snug fit to the tail of the dog wearer at the base end of the tail sleeve, making the tail sleeve connect to at least two lateral straps and at least one medial strap, making the at least two lateral straps of the tail sleeve connect to a dog harness, making the at least one medial strap as one medial strap, making the one medial strap connect around the waist of the dog wearer, making the at least two lateral straps connect the dog harness permanently to the tail sleeve, making the tail protection device include a rump cover, making the snug fit at the base end of the tail sleeve include a 'v' opening, and making the 'v' opening on the base end of the tail sleeve include a closure.

5. A method of using the tail protection device of claim 1, comprising:

placing the tail sleeve over the tail so that the tail sleeve being longer than a tail of the dog wearer such that the tip-covering end extends past the end of the tail and the base end of the tail sleeve is closer to the rump of the dog wearer;

placing the rump cover, the least two lateral straps, and the dog harness along the dog wearer's back;

connecting the two medial straps to the nadir area of the dog harness, thereby securing the tail protection device on the dog wearer;

using the 'v' opening on the base end of the tail sleeve to form a snug fit to base of the tail of the dog wearer; and securing the closure at the 'v' opening on the base end of the tail sleeve.

6. A method of using the tail protection device of claim 2, comprising:

placing the tail sleeve over the tail of the dog wearer, the tail sleeve being longer than a tail of the dog wearer such that the tip-covering end extends past the end of the tail, and the base end of the tail sleeve making a snug fit to the tail of the dog wearer;

placing the rump cover, the least two lateral straps, and the dog harness along the dog wearer's back;

connecting the one medial strap of the tail protection device around the waist of the dog wearer;

close the closure at the base end of the tail sleeve included in the 'v' opening; and securing the dog harness to the dog wearer.

* * * * *